United States Patent
Lim et al.

(10) Patent No.: US 9,155,115 B2
(45) Date of Patent: Oct. 6, 2015

(54) METHOD AND APPARATUS FOR GENERATING CONNECTION IDENTIFIER FOR DEVICE-TO-DEVICE COMMUNICATION

(71) Applicant: Samsung Electronics Co. Ltd., Suwon-si, Gyeonggi-do (KR)

(72) Inventors: Chi-Woo Lim, Suwon-si (KR); Kyung-Kyu Kim, Suwon-si (KR); Seung-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 13/654,772

(22) Filed: Oct. 18, 2012

(65) Prior Publication Data

US 2013/0094480 A1    Apr. 18, 2013

(30) Foreign Application Priority Data

Oct. 18, 2011    (KR) .................. 10-2011-0106223

(51) Int. Cl.
*H04W 72/04*    (2009.01)
*H04W 76/02*    (2009.01)
*H04W 92/18*    (2009.01)
*H04B 7/26*    (2006.01)

(52) U.S. Cl.
CPC .............. *H04W 76/021* (2013.01); *H04B 7/26* (2013.01); *H04W 72/04* (2013.01); *H04W 76/023* (2013.01); *H04W 92/18* (2013.01)

(58) Field of Classification Search
USPC ................... 370/254, 328–336; 455/414.1
See application file for complete search history.

(56) References Cited

U.S. PATENT DOCUMENTS

| | | |
|---|---|---|
| 2009/0017801 A1* | 1/2009 | Laroia et al. ............... 455/414.1 |
| 2010/0110929 A1* | 5/2010 | Li et al. ........................ 370/254 |
| 2010/0302945 A1 | 12/2010 | Leppanen et al. |
| 2010/0304759 A1 | 12/2010 | Leppanen et al. |
| 2010/0306320 A1 | 12/2010 | Leppanen et al. |
| 2011/0238751 A1 | 9/2011 | Belimpasakis et al. |

* cited by examiner

*Primary Examiner* — Vincelas Louis
(74) *Attorney, Agent, or Firm* — Jefferson IP Law, LLP

(57) ABSTRACT

A method and a device for generating a CID for D2D communication are provided. A transmitting device transmits a request for direct communication between the transmitting device and a receiving device on a resource unit of a first resource index determined based upon at least one of a device ID of the transmitting device or of the receiving device during a first period, receives information about at least one used CID being used by at least one surrounding device from the peripheral device during a second period, transmits information including at least one available CID acquired during the second period on a resource unit of a second resource index being identical to the first resource index during a third period, and determines at least one CID to be used for D2D communication between the transmitting device and the receiving device based on the transmitted information.

32 Claims, 7 Drawing Sheets

METHOD AND APPARATUS FOR GENERATING CONNECTION IDENTIFIER FOR DEVICE-TO-DEVICE COMMUNICATION

PRIORITY

This application claims the benefit under 35 U.S.C. §119 (a) of a Korean patent application filed on Oct. 18, 2011 in the Korean Intellectual Property Office and assigned Serial No. 10-2011-0106223, the entire disclosure of which is hereby incorporated by reference.

BACKGROUND OF THE INVENTION

1. Field of the Invention

The present invention relates to Device-to-Device (D2D) communication. More particularly, the present invention relates to a method and apparatus for generating Connection Identifiers (CIDs) to be used for D2D communication.

2. Description of the Related Art

With the development of communication devices and communication systems, users of the communication devices require services by which they can easily access and share their desired information anytime. Recently, the advent of smart phones and tablet Personal Computers (PCs) has offered a new environment in which users may acquire and share a variety of information over a wireless communication system. However, in the case of the wireless communication systems, users cannot acquire and share desired information unless a wireless communications infrastructure is built. In addition, due to complexity and time delay, a given wireless communication system may not be capable of efficiently providing the real-time information which may appear as minor, but is nonetheless useful in everyday life.

To address these shortcomings, Device-to-Device (D2D) service has emerged, which is performed directly between devices via a D2D communication link. The D2D link operates without certain network entities, such as base stations, in spaces that have no communications infrastructure.

A device supporting this service acquires synchronization with its surrounding devices, discovers the surrounding devices using preset resources at a preset time, and acquires device information of the discovered surrounding devices. The device information may include identification information, interest information and application information of the discovered devices.

As described above, devices supporting a D2D service perform a process of discovering surrounding devices via or using preset resources for a preset time, and generating a CID for a communication connection with other desired devices.

To provide additional support in such a D2D system, a system and method is provided for minimizing power consumption in devices supporting a D2D service, and for increasing the efficiency of generating CID in devices operating within a D2D service.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for providing a Device-to-Device (D2D) service.

Another aspect of the present invention is to provide a method and apparatus for generating Connection Identifiers (CID) for D2D communication in a D2D communication system.

Another aspect of the present invention is to provide a method and apparatus for reducing the overhead caused by the generation of a CID for D2D communication in a D2D communication system.

In accordance with an aspect of the present invention, a method for generating a CID for D2D communication is provided. The method includes transmitting a request signal for requesting direct communication between a transmitting device and a receiving device on a resource unit of a first resource index determined based upon at least one of a device ID of the transmitting device and a device ID of the receiving device during a predetermined first period, receiving information about at least one used CID being used by at least one surrounding device from the surrounding device during a second period following the first period, transmitting generation information including at least one available CID acquired during the second period on a resource unit of a second resource index being identical to the first resource index during a third period following the second period, and determining at least one CID to be used for D2D communication between the transmitting device and the receiving device, based on the generation information.

In accordance with another aspect of the present invention, a method for generating a CID for D2D communication is provided. The method includes receiving a request signal for requesting direct communication between a transmitting device and a receiving device from the transmitting device on a resource unit of a first resource index determined based on at least one of a device ID of the transmitting device and a device ID of the receiving device during a predetermined first period, receiving information about at least one used CID being used by at least one surrounding device from the surrounding device during a second period following the first period, receiving generation information including at least one CID available by the transmitting device from the transmitting device on a resource unit of a second resource index being identical to the first resource index, during a third period following the second period, and selecting at least one CID to be used for D2D communication between the transmitting device and the receiving device, based on the generation information.

In accordance with another aspect of the present invention, a transmitting device for generating a CID for D2D communication is provided. The transmitting device includes a controller for determining a first resource index for transmitting a request signal for requesting direct communication between a transmitting device and a receiving device, and a second resource index being identical to the first resource index, based on at least one of a device ID of the transmitting device and a device ID of the receiving device, a transmitter for transmitting the request signal on a resource unit of the first resource index during a predetermined first period, and a receiver for receiving information about at least one used CID being used by at least one surrounding device from the surrounding device during a second period following the first period. The controller controls the transmitter to transmit generation information including at least one available CID acquired during the second period, on a resource unit of the second resource index during a third period following the second period and determines at least one CID to be used for D2D communication between the transmitting device and the receiving device, based on the generation information.

In accordance with another aspect of the present invention, a receiving device for generating a CID for D2D communication is provided. The receiving device includes a controller for determining a first resource index for receiving a request signal for requesting direct communication between a transmitting device and a receiving device and a second resource index being identical to the first resource index, based on at least one of a device ID of the transmitting device and a device ID of the receiving device, a receiver for receiving the request signal from the transmitting device on a resource unit of the first resource index during a predetermined first period, receiving information about at least one used CID being used by at least one surrounding device from the surrounding device during a second period following the first period, and receiving generation information including at least one CID available by the transmitting device from the transmitting device on a resource unit of the second resource index during a third period following the second period, and a transmitter. The controller selects at least one CID to be used for D2D communication between the transmitting device and the receiving device based on the generation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

A description will now be made of a technology for generating a Connection Identifier (CID) for Device-to-Device (D2D) communications in a communication system supporting a D2D service. As an example, generating a CID for D2D communication may include a process of requesting a CID, a process of finding a CID being used, and a process of generating a requested CID.

Figure 1:
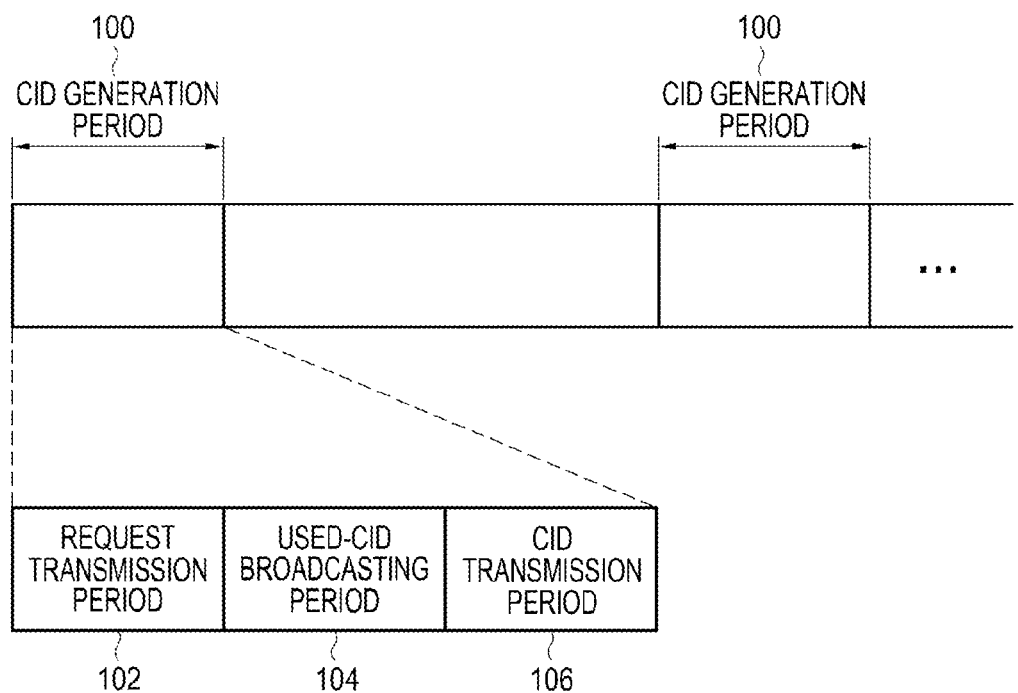
FIG. 1 shows a Connection Identifier CID generation period for a Device-to-Device (D2D) communication system according to an exemplary embodiment of the present invention.

FIG. 1 shows a CID generation period for a D2D communication system according to an exemplary embodiment of the present invention.

As shown in FIG. 1, a wireless communication system supporting D2D communication sets a CID generation period 100. During the CID generation period 100, devices desiring D2D communication may generate a CID for D2D communication. The CID generation period 100 may occur at predetermined time intervals.

The CID generation period 100 may be divided into a request transmission period (or request signal transmission period) 102, a used-CID broadcasting period (or used-CID transmission period) 104, and a CID transmission period (or CID generation information transmission period) 106. Each of the periods 102, 104 and 106 may be given by the designers or system operators, or may have a time length agreed in advance between devices.

The request transmission period 102 includes an operation in which a device (i.e., a transmitting device) desiring to perform D2D communication may request another device (i.e., a receiving device) for D2D communication to generate a CID. The used-CID broadcasting period 104 may include an operation in which all devices supporting D2D communication transmit (or broadcast) the CID they are using to surrounding devices or peripheral devices. The CID transmission period 106 may include an operation in which the transmitting device desiring D2D communication transmits a CID list including available CIDs to the receiving device, allowing the receiving device to determine a CID to be used in the connection.

During the request transmission period 102, a transmitting device may transmit a request signal (i.e., paging signal) for requesting generation of a CID to the receiving device to which the transmitting device desires to make a connection, using information about the device that the transmitting device has discovered by device discovery. The request signal may be transmitted to inform the receiving device of the transmitting device's desire for a connection thereto. Before the transmission, the transmitting device may select resources on which the request signal should be transmitted. The resources may be selected based upon at least one of a device ID of the transmitting device and a device ID of the receiving device. In other words, a resource unit that is used for transmission of a request signal during the request transmission period 120 may have a first resource index that is determined based upon at least one of the device ID of the transmitting device and the device ID of the receiving device.

As an example, the transmitting device may determine the first resource index corresponding to the device ID of the receiving device, and may transmit a request signal through or using the resource unit indicated by the first resource index. For example, the transmitting device may determine, as a first resource index to be used for transmission of a request signal, a final result value obtained by performing a modulo operation (MOD) on the device ID of the receiving device with a particular amount of resources (i.e., a resource size of the request transmission period 102) that can be used for transmission of the request signal.

Figure 2A:
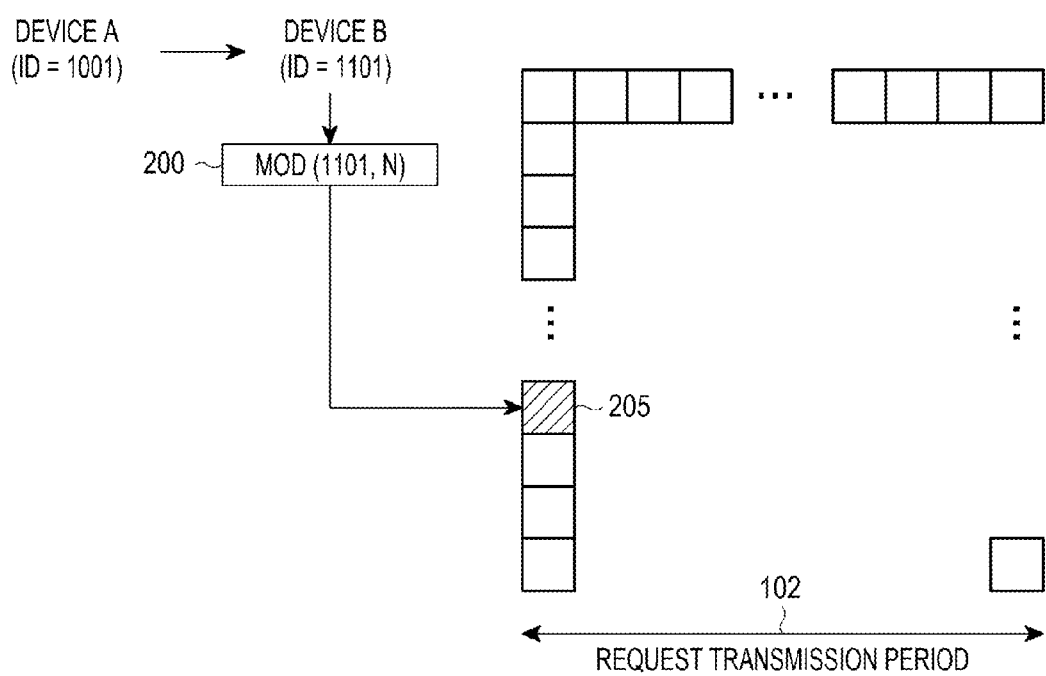
FIGS. 2A and 2B show operations in a request transmission period in a CID generation period according to different exemplary embodiments of the present invention.

FIG. 2A shows an operation in a request transmission period in a CID generation period according to an exemplary embodiment of the present invention.

As shown in FIG. 2A, a device A operating as a transmitting device has a device ID of 1001, and a device B operating as a receiving device has a device ID of 1101. The device ID of the receiving device is 1101, and MOD(1101,N), calculated by the amount N of resources (e.g., the number of resource units included in the request transmission periods 102) which may determined in advance so that they may be used in the request transmission period 102, is a resource index 200 to be used to transmit a request signal.

The device A may transmit a request signal for requesting generation of a CID to the device B on a resource unit 205 indicated by the resource index 200 of MOD(1101,N). For example, each resource unit may include one or more frequency tones (or sub carriers) and one or more symbol periods, and may have a size that enables transmission of at least a request signal.

As another example, the transmitting device may determine, as a first resource index indicating a resource unit used for transmission of a request signal, a result value obtained by performing a predetermined operation (e.g., an XOR operation) on the device ID of the transmitting device (e.g., itself) and the device ID of the receiving device. Thereafter, the transmitting device may perform a modulo operation on the results of the predetermined operation with an amount of resources (i.e., the resource size of the request transmission period 102) that can be used for transmission of a request signal. The receiving device may also obtain the same first resource index through the same procedure, and may monitor reception of a request signal on a resource unit indicated by the first resource index.

Each device may obtain a device ID of another device through a device discovery process that is performed before transmission of a request signal. The first resource index, determined based on at least one of the device ID of the transmitting device and the device ID of the receiving device, may be mapped to a second resource index, indicating a resource unit to be used in the CID transmission period 106, on a one-to-one basis depending on a predetermined mapping relationship.

Figure 2B:
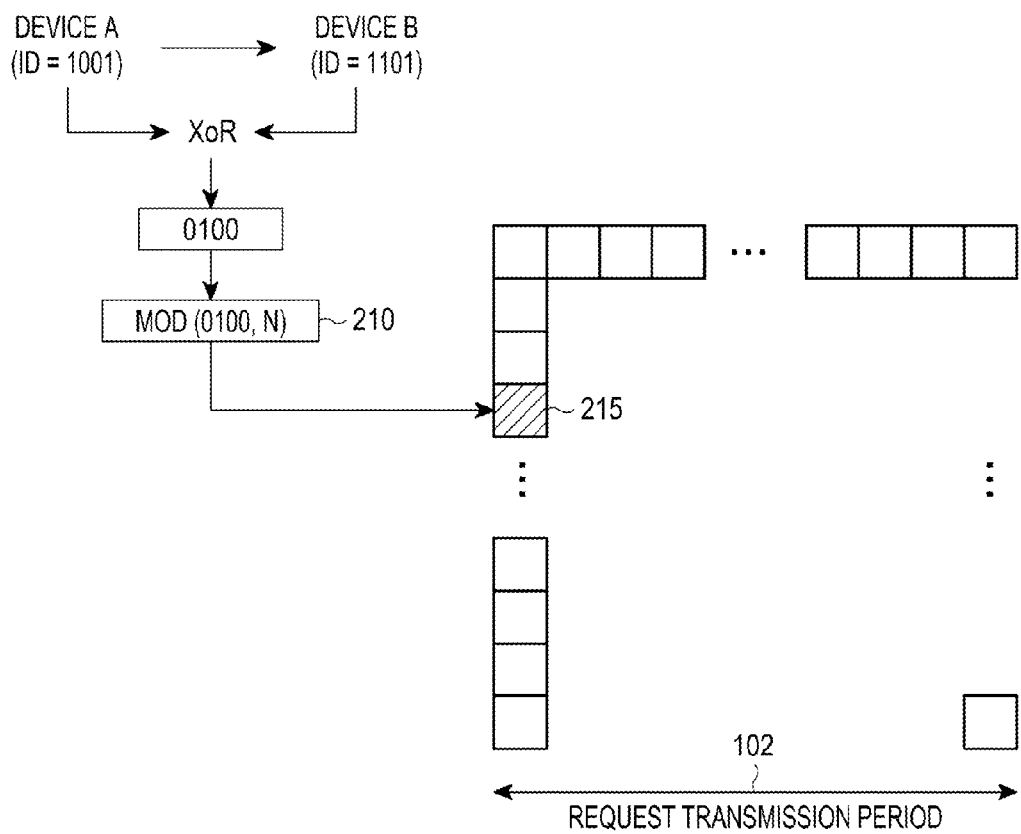

FIG. 2B shows an operation in a request transmission period in a CID generation period according to another exemplary embodiment of the present invention.

As shown in FIG. 2B, a device A operating as a transmitting device has a device ID of 1001, and a device B operating as a receiving device has a device ID of 1101. XOR operation results on the two device IDs are 0100, and MOD(0100,N), calculated by the amount N of resources (e.g., the number of resource units included in the request transmission period 102) which may be determined in advance so that they may be used in the request transmission period 102, is a resource index 210 to be used to transmit a request signal.

The device A may transmit a request signal for requesting generation of a CID, to the device B on a resource unit 215 indicated by the resource index 210 of MOD(0100,N). For example, each resource unit may include one or more frequency tones (or sub carriers) and one or more symbol periods, and may have a size that enables transmission of at least a request signal.

Additionally, a device that does not send a request signal in the request transmission period 102 may attempt to receive a request signal transmitted from another device. In the example of FIG. 2B, the device B calculates a resource index 210 by performing an XOR operation and a MOD on its own device ID and on a device ID of at least one other device (e.g., device A) which may be discovered during a device discovery period, and may monitor whether a request signal is received on a resource unit 215 indicated by the resource index 210.

Device B may stop its operation during the remaining period of the CID generation period 100 if no request signal is detected on resources with resource indexes associated with all devices which are discovered in the device discovery period. Additionally, if a request signal is received, device B may perform an operation of discovering CIDs being used by other devices in the following used-CID broadcasting period 104. The device A may also operate in a similar way.

For all devices supporting D2D communication, if they already have at least one CID being used, the devices may transmit or broadcast the at least one used CID on a resource unit of a resource index corresponding thereto during the used-CID broadcasting period 104. All CIDs available for D2D communication may each be uniquely mapped to one resource unit and transmitted on an associated resource unit during the used-CID broadcasting period 104. Resource units of the used-CID broadcasting period 104 each may be configured in a size that enables transmission of one CID.

A device that already has at least one CID being used may transmit or broadcast the CID on its associated resource unit of the used-CID broadcasting period 104 in order to prevent other devices from using the CID. Such a device may receive used CIDs from other devices during their remaining resource units where they do not transmit their CIDs. A transmitting device desiring to newly generate a CID and a receiving device having received a request signal from another device may check CIDs being already used among all the CIDs during the used-CID broadcasting period 104.

Additionally, if a device which already has a CID being used desires to newly generate a CID with another device, i.e., if a transmitting device in the request transmission period 102 already has another CID, the transmitting device may need to know CIDs being used by other devices while notifying other devices or broadcasting the CID that it is using.

To this end, the used-CID broadcasting period 104 may be divided into two sub broadcasting periods, and in each sub broadcasting period, devices may broadcast the CID that they are using. As a result, transmission of the used CID may be repeated twice. To this end, each sub broadcasting period may be configured in a size that enables transmission of all CIDs available for D2D communication. For example, if the number of all CIDs is 1000, each sub broadcasting period may include 1000 resource units.

Mapping between resource indexes and CIDs may have a transpose relationship between two sub broadcasting periods. Therefore, each device may check, in another sub broadcasting period, another CID that it could not receive while transmitting its own CID in one sub broadcasting period.

Figure 3A:
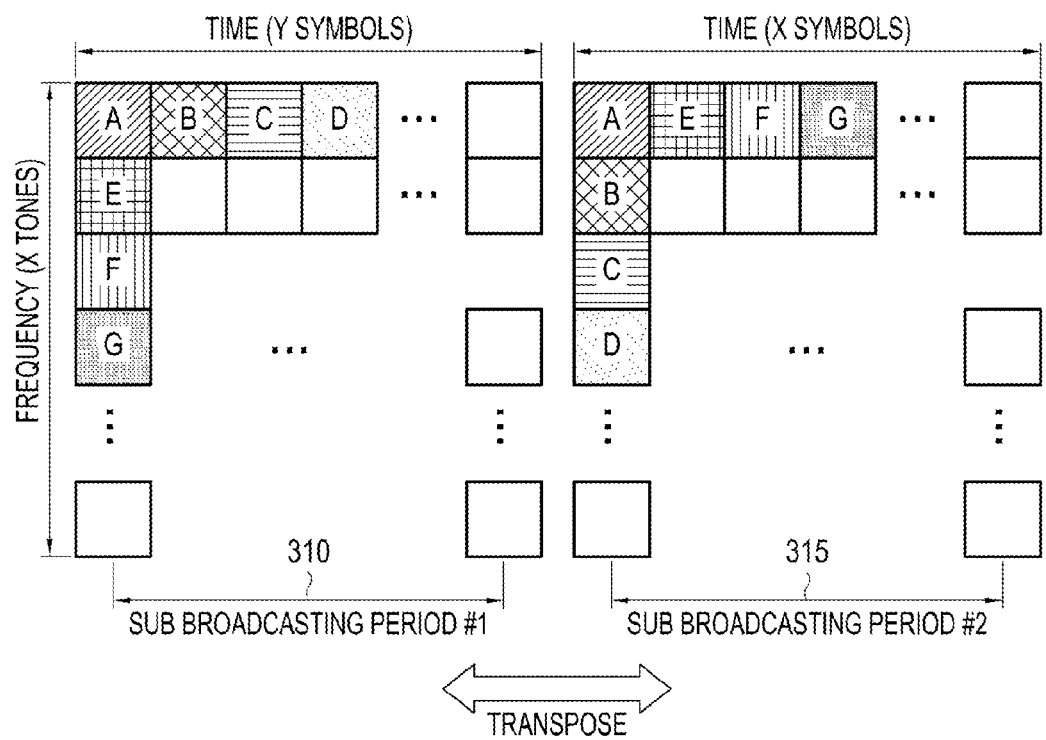
FIGS. 3A and 3B show structures of a used-CID broadcasting period according to different exemplary embodiments of the present invention.

FIG. 3A shows a structure of a used-CID broadcasting period 104 according to an exemplary embodiment of the present invention.

As shown in FIG. 3A, the used-CID broadcasting period 104 is divided into two sub broadcasting periods 310 and 315, and the second sub broadcasting period (sub broadcasting period #2) 315 has resource indexes in the form where resource indexes of the first sub broadcasting period (sub broadcasting period #1) 310 are transposed on the time-frequency domain. Therefore, each device may transmit information about its used CID on different resource units (at least one frequency tone and at least one symbol period) which may be associated with each other in the first sub broadcasting period 310 and in the second sub broadcasting period 315.

Specifically, a CID A may be uniquely mapped to a resource index A. The resource index A may indicate a resource unit of (frequency tone, symbol period)=(X,Y) in the first sub broadcasting period 310, and may indicate a resource unit of (frequency tone, symbol period)=(Y,X) in the second sub broadcasting period 315.

In the example shown in the drawing, information about a CID B is transmitted on a first frequency tone and a second symbol period in the first sub broadcasting period 310, while it is transmitted on a second frequency tone and a first symbol period in the second sub broadcasting period 315. Thereafter, a device having transmitted the CID B may receive used CIDs of other devices in symbol periods following the first and second symbol periods of the first sub broadcasting period 310, and may receive used CIDs of other devices in symbol periods following the first symbol period of the second sub broadcasting period 315. Therefore, the device may receive, in the second sub broadcasting period 315, the used CIDs of other devices which it failed to detect in the second symbol period of the first sub broadcasting period 310.

Although the two sub broadcasting periods 310 and 315 are assumed to be divided in the time domain, they may be divided in the time domain and/or frequency domain depending on the choice of the designers or system operators.

It may be preferable that the X-axis and Y-axis (time domain and frequency domain) of resources used in each of the sub broadcasting periods 310 and 315 may have the same amount of resource units. For example, if the amount of resources needed for transmission of used CIDs is 100, each sub broadcasting period for transmission of used CIDs may include 10 frequency units (i.e., frequency tones) and 10 time units (i.e., symbol periods). As a result, it may be preferable to use a total of 20 time units for transmission of used CIDs.

Each device may receive and store used CIDs transmitted from other devices during the used-CID broadcasting period 104, and based thereon, may generate an available CID list including CIDs (i.e., available CIDs) that are unused.

Figure 3B:
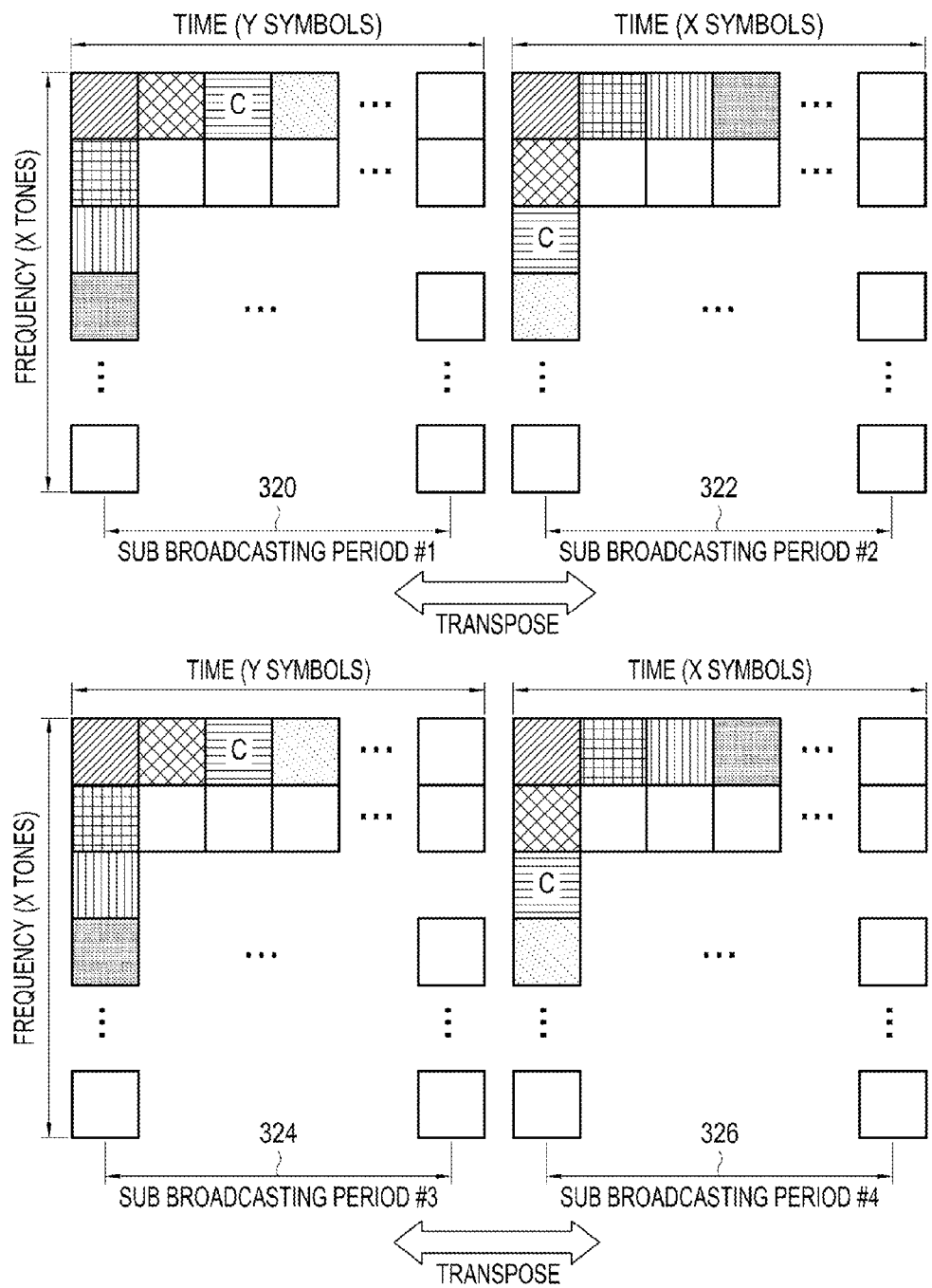

FIG. 3B shows a structure of a used-CID broadcasting period 104 according to another exemplary embodiment of the present invention. In the example shown in the drawing, the used-CID broadcasting period 104 is divided into two sub broadcasting periods 320 and 322 in which any one device of a pair of transmitting-receiving devices having a CID being used transmits the used CID, and two sub broadcasting periods 324 and 326 in which another device of the pair of the transmitting-receiving devices transmits the used CID.

The second sub broadcasting period (sub broadcasting period #2) 322 has resource indexes such that resource indexes of the first sub broadcasting period (sub broadcasting period #1) 320 may be transposed on the time-frequency domain, and the fourth sub broadcasting period (sub broadcasting period #4) 326 may have resource indexes such that resource indexes of the third sub broadcasting period (sub broadcasting period #3) 324) may be transposed on the time-frequency domain. Therefore, each device may transmit information about its used CID on different resource units (e.g., at least one frequency tone and at least one symbol period) which may be associated with each other in the first two sub broadcasting periods 320 and 322 or in the last two sub broadcasting periods 324 and 326.

Specifically, a CID A may be uniquely mapped to a resource index A. The resource index A may indicate a resource unit of (frequency tone, symbol period)=(X1,Y1) in the first sub broadcasting period 320, and indicate a resource unit of (frequency tone, symbol period)=(Y1,X1) in the second sub broadcasting period 322. Also, a CID B may be uniquely mapped to a resource index B, and the resource index B may indicate a resource unit of (frequency tone, symbol period)=(X2,Y2) in the third sub broadcasting period 324, and indicate a resource unit of (frequency tone, symbol period)=(Y2,X2) in the fourth sub broadcasting period 326.

Exemplary embodiments of detailed transmissions of the present invention are as follows. Hereinafter, a CID C may be used for a connection between a device A and a device B. In the connection, the device A may operate as a transmitting device and device B may operate as a receiving device.

The device A may transmit information about the CID C on the first frequency tone and third symbol period in the first sub broadcasting period 320 of the used-CID broadcasting period 104. The device A may transmit the information about the CID C on the third frequency tone and first symbol period in the second sub broadcasting period 322 of the used-CID broadcasting period 104. Thereafter, the device A may attempt to receive used CIDs of other devices in the remaining symbol periods except for the third symbol period in the first sub broadcasting period 320, and may also attempt to receive used CIDs of other devices in the remaining symbol periods except for the first symbol period in the second sub broadcasting period 322. The device A may detect reception of used CIDs of other devices without transmitting information about its used CID in the third and fourth sub broadcasting periods 324 and 326.

The device B may transmit information about the CID C on the first frequency tone and third symbol period in the third sub broadcasting period 324 of the used-CID broadcasting period 104. The device B may transmit the information about the CID C on the third frequency tone and the first symbol period in the fourth sub broadcasting period 326 of the used-CID broadcasting period 104. Thereafter, the device B may attempt to receive used CIDs of other devices in the remaining symbol periods except for the third symbol period in the third sub broadcasting period 324, and may also attempt to receive used CIDs of other devices in the remaining symbol periods except for the first symbol period in the fourth sub broadcasting period 326. The device B may detect reception of used CIDs of other devices without transmitting information about its used CID in the first and second sub broadcasting periods 320 and 322.

In another exemplary embodiment of the present invention, a receiving device establishing the connection may transmit its used CID in the first and second sub broadcasting periods 320 and 322, and a transmitting device, or another device, may transmit its used CID in the third and fourth sub broadcasting periods 324 and 326.

Although the sub broadcasting periods 320 and 326 are assumed to be divided in the time domain, they may be divided in the time domain and/or frequency domain depending on the choice of the designers or system operators.

For the transposition of resource indexes, it may be preferable that the X-axis and Y-axis (time domain and frequency domain) of resources used in each of the sub broadcasting periods 320 and 326 may have the same amount of resource units.

By configuring the used-CID broadcasting period 104 with four sub broadcasting periods 320 to 326 in this manner, it may be possible to allow a device pair already having a connection to determine whether to maintain the connection. In other words, by detecting used CIDs in each of the sub broadcasting periods 320 to 326, each device may check CIDs available for a new connection, and may also determine whether to continue the connection of its previous CID.

Each device may receive and store used CIDs transmitted from other devices during the used-CID broadcasting period 104, and based thereon, may generate an available CID list including CIDs (i.e., available CIDs) that are unused.

Hereafter, an operation in the CID transmission period 106 will be described.

During the CID transmission period 106, a transmitting device may transmit generation information needed for CID generation. The generation information may include at least one of a device ID of a transmitting device that transmits the generation information, a device ID of a receiving device to which the transmitting device desires to make a connection, information about the type and Quality of Service (QoS) of a service to be performed through the connection, and a list of available CIDs which are determined in the used-CID broadcasting period 104. It may be preferable that the same resource indexes as those used in the request transmission period 102 are used for transmission of the generation information. Therefore, a receiving device may wait for the generation information to be received from the transmitting device on resource units indicated by the resource indexes that the receiving device already knows.

The receiving device may acquire an available CID list of the transmitting device by receiving the generation information from the transmitting device, selecting at least one common CID to use it for a connection with the transmitting device by comparing the acquired available CID list with its own available CID list, and then transmitting information about the selected at least one CID to the transmitting device. The transmitting device may determine to use the selected at least one CID for its connection with the receiving device.

In an exemplary embodiment of the present invention, the information about the selected CID may be transmitted using the same resource indexes as those in the generation information. To this end, CID transmission period 106 may include a pair of transmission units indicated by the same resource indexes. The pair of transmission units may include transmitting transmission units and receiving transmission units, which may be temporally distinguishable, and each of the transmitting transmission units and the receiving transmission units may be configured in a size that enables transmission of the generation information and information about the selected CID.

Figure 4:
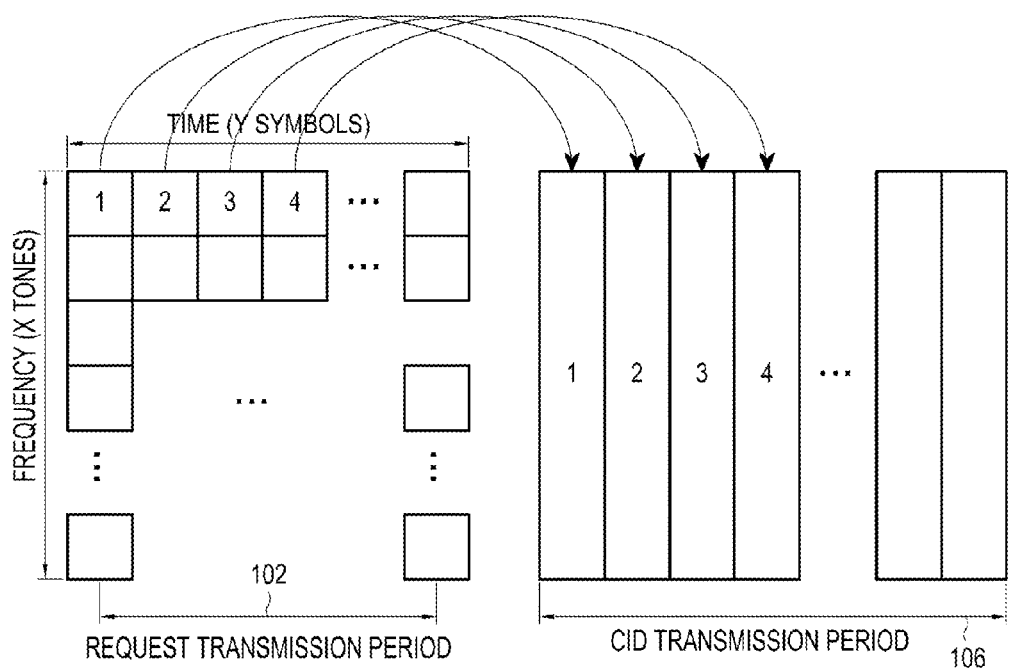
FIG. 4 shows mapping between a request transmission period and a CID transmission period according to an exemplary embodiment of the present invention.

FIG. 4 shows mapping between a request transmission period and a CID transmission period according to an exemplary embodiment of the present invention.

As shown in FIG. 4, a CID transmission period 106 includes resource units capable of transmitting the generation information that should be transmitted to each device. The resource units of the CID transmission period 106 may be divided in the time domain. A device may determine on which resource unit among the resources it will transmit its generation information. In order to determine the resource unit on which it will transmit the generation information, the device may make reference to the resource index it used in the request transmission period 102.

In other words, a transmitting device may transmit a request signal for generation of a CID to a receiving device during the request transmission period 102, and may transmit generation information using the same resource index as that used to transmit the request signal during the CID transmission period 106. Similarly, a receiving device may receive a request signal from a transmitting device during the request transmission period 102, and attempt to receive generation information from the transmitting device on a resource unit indicated by the same resource index as that used to receive the request signal during the CID transmission period 106.

In the foregoing case, one resource unit may be simultaneously used by a plurality of devices. Therefore, generation information may be scrambled with a device ID of a transmitting device, and only the receiving device that knows the device ID of the transmitting device may be capable of descrambling and analyzing the scrambled generation information. In an alternative exemplary embodiment of the present invention, the generation information may be scrambled with a device ID of a receiving device. In another alternative exemplary embodiment of the present invention, the generation information may be scrambled by a combination of device IDs of a transmitting device and a receiving device.

Figure 5:
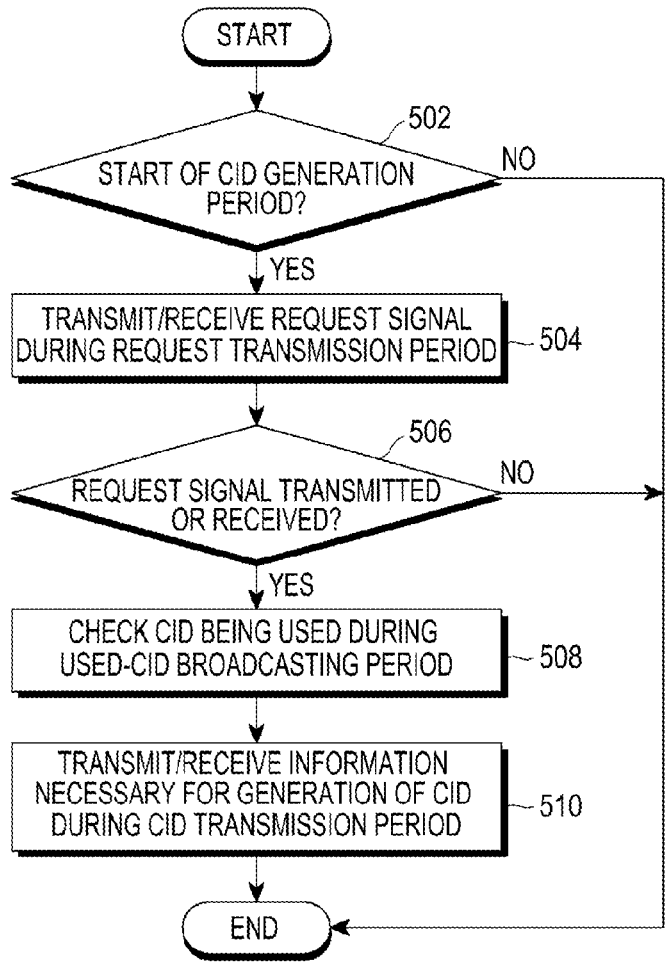
FIG. 5 shows a procedure of generating a CID for D2D communication according to an exemplary embodiment of the present invention.

FIG. 5 shows a procedure of generating a CID for D2D communication according to an exemplary embodiment of the present invention. Operations of both a transmitting device and a receiving device will be described with reference to FIG. 5, since they are similar to each other.

Referring to FIG. 5, a device determines in step 502 whether a CID generation period has come. If the current period is not the CID generation period, the device ends the algorithm.

If the CID generation period has come, the device may transmit a request signal for requesting generation of a CID to another device or receive a request signal from the other device during a predetermined request transmission period in the CID generation period in step 504. The device may know in advance a device ID of the other device by device discovery, thus, it may determine the resource position where the request signal is transmitted or received based on its own device ID and the device ID of the opponent device.

In step 506, the device may determine whether it has transmitted or received a request signal during the request transmission period. If no request signal is transmitted or received, the device may end the algorithm, determining that there is no surrounding device with which the device may perform D2D communication.

Additionally, if it has transmitted or received a request signal during the request transmission period, the device may, in step 508, transmit or broadcast a used-CID list including at least one CID being used by the device itself, or receive a used-CID list including at least one CID being used by at least one surrounding device from the surrounding device during the following used-CID broadcasting period. In this way, the device may determine at least one available CID. The device may make an available CID list including at least one available CID by excluding CIDs being used by the device itself or the surrounding devices from its CID pool.

In step 510, the device may transmit generation information including the available CID list or receive generation information from the opponent device with which it wishes D2D communication during the following CID transmission period. A CID to be used for a connection with the other device may be selected and determined based on the generation information. The generation information may be transmitted using a resource mapped to the resource index used for transmission of the request signal in the CID transmission period.

Figure 6:
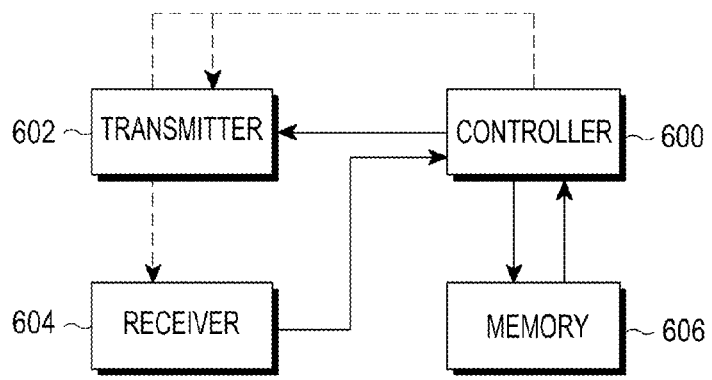
FIG. 6 shows a structure of a device supporting D2D communication according to an exemplary embodiment of the present invention.

FIG. 6 shows a structure of a device supporting D2D communication according to an exemplary embodiment of the present invention. As shown in the drawing, the device may include a controller 600, a transmitter 602 and a receiver 604 capable of performing D2D communication, and a memory 606 for storing D2D-related information and program codes.

Referring to FIG. 6, the controller 600 may control the transmitter 602 to transmit a request signal for requesting generation of a CID to another device or control the receiver 604 to receive a request signal from the other device during a request transmission period 102 which is the beginning of a CID generation period 100. The transmitter 602 may transmit a request signal received from the controller 600 to the opponent device, and the receiver 604 may transfer a request signal received from the opponent device to the controller 600. The controller 600 may provide the transmitter 602 or the receiver 604 with the resource index that the controller 600 has determined based on a device ID of the device itself and a device ID of the opponent device. The transmitter 602 and the receiver 604 may transmit and receive the request signal on a resource unit indicated by the resource index.

If the controller 600 transfers no request signal to the transmitter 602 or if no request signal is received via the receiver 604, the controller 600 may control the transmitter 602 and the receiver 604 not to operate (or to be disabled) during the following used-CID broadcasting period 104 and CID transmission period 106, and may wait until the next CID generation period 100 has come.

Additionally, if the controller 600 has transferred a request signal to the transmitter 602 or if a request signal has been received via the receiver 604, the controller 600 may control the transmitter 602 to transmit or broadcast a used CID of the device itself during the following used-CID broadcasting period 104. The transmitter 602 may repeatedly broadcast the used CID in two sub broadcasting periods of the used-CID broadcasting period 104. The used CID may be transmitted on a resource unit that uniquely corresponds to the used CID in the used-CID broadcasting period 104, and during the remaining resource units, the receiver 604 may receive used-CID lists transmitted from other devices and transfer them to the controller 600.

If the controller 600 transmits a request signal via the transmitter 602 during the request transmission period 102, the controller 600 may control the transmitter 602 to transmit generation information needed for CID generation during the CID transmission period 106. The generation information may be transmitted using a transmission resource unit indicated by the same resource index as that used to transmit the request signal. The receiver 604, under control of the controller 600, may receive generation information transmitted from other devices and transfer it to the controller 600 during the CID transmission period 106. Similarly, the generation information may be received using a reception resource unit indicated by the same resource index as that used to transmit the request signal.

The controller 600 may determine a CID to be used for scheduling of its D2D communication with another device based on its generation information or the received generation information, and may stores the determined CID in the memory 606.

As is apparent from the foregoing description, according to the disclosed exemplary embodiments of the present invention, a device may operate only when necessary in generating a CID for a D2D service, thereby reducing its power consumption and ensuring the efficient use of resources. In addition, the exemplary embodiments of the present invention may address the problem that while transmitting a CID, a device may not recognize the transmission, making it possible for the device to generate a plurality of CIDs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a Connection Identifier (CID) for Device-to-Device (D2D) communication, the method comprising:
   transmitting a request signal for requesting direct communication between a transmitting device and a receiving device on a resource unit of a first resource index determined based upon a device ID of the transmitting device and a device ID of the receiving device during a predetermined first period;
   receiving information about at least one used CID being used by at least one surrounding device from the at least one surrounding device during a second period following the first period;
   transmitting generation information including at least one available CID acquired during the second period to the receiving device, on a resource unit of a second resource index being identical to the first resource index during a third period following the second period; and
   determining at least one CID to be used for D2D communication between the transmitting device and the receiving device from the at least one available CID included in the transmitted generation information,
   wherein the first resource index is calculated by performing a predetermined operation on the device ID of the transmitting device and the device ID of the receiving device and performing a modulo operation on a result value of the predetermined operation.

2. The method of claim 1, wherein the first resource index is determined based on the device ID of the receiving device.

3. The method of claim 1, wherein the first resource index is calculated by performing the predetermined operation on the device ID of the transmitting device and the device ID of the receiving device, and performing the modulo operation on the result value of the predetermined operation with an amount of resources constituting the first period.

4. The method of claim 1, further comprising:
   transmitting information about the at least one used CID on a resource unit of a third resource index in a first sub period among first and second sub periods constituting the second period; and
   transmitting information about the at least one used CID in the second sub period on a resource unit of a fourth resource index having a transpose relationship with the third resource index,
   wherein, in each of the sub periods, information about the at least one used CID is detected from the at least one surrounding device during remaining symbol periods except for symbol periods in which the information about the at least one used CID is transmitted.

5. The method of claim 1, further comprising:
transmitting information about the at least one used CID being used by the transmitting device on a resource unit of a third resource index in a first sub period among first to fourth sub periods constituting the second period; and
transmitting information about the at least one used CID being used by the transmitting device in the second sub period on a resource unit of a fourth resource index having a transpose relationship with the third resource index,
wherein:
the first and second sub periods are determined as first two sub periods or last two sub periods of the second period, and
in each of the sub periods, information about the at least one used CID is detected from the at least one surrounding device during remaining symbol periods, except for symbol periods in which the information about the at least one used CID is transmitted.

6. The method of claim 1, wherein the generation information further includes at least one of the device ID of the transmitting device, the device ID of the receiving device, and information about the type and Quality of Service (QoS) of a service to be performed through a connection.

7. The method of claim 1, further comprising:
after transmitting the generation information in the third period, receiving information about at least one available CID selected by the receiving device from the receiving device on a resource unit corresponding to the resource unit of the second resource index.

8. The method of claim 1, wherein the generation information is scrambled with at least one of the device ID of the transmitting device and the device ID of the receiving device before being transmitted.

9. A method for generating a Connection Identifier (CID) for Device-to-Device (D2D) communication, the method comprising:
receiving a request signal for requesting direct communication between a transmitting device and a receiving device from the transmitting device on a resource unit of a first resource index determined based on a device ID of the transmitting device and a device ID of the receiving device during a predetermined first period;
receiving information about at least one used CID being used by at least one surrounding device from the surrounding device during a second period following the first period;
receiving generation information including at least one CID available by the transmitting device from the transmitting device on a resource unit of a second resource index being identical to the first resource index during a third period following the second period; and
selecting at least one CID to be used for D2D communication between the transmitting device and the receiving device from the at least one available CID included in the received generation information,
wherein the first resource index is calculated by performing a predetermined operation on the device ID of the transmitting device and the device ID of the receiving device and performing a modulo operation on a result value of the predetermined operation.

10. The method of claim 9, wherein the first resource index is determined based on the device ID of the receiving device.

11. The method of claim 9, wherein the first resource index is calculated by performing the predetermined operation on the device ID of the transmitting device and the device ID of the receiving device, and performing the modulo operation on the result value of the predetermined operation with an amount of resources constituting the first period.

12. The method of claim 9, further comprising:
transmitting information about the at least one used CID on a resource unit of a third resource index in a first sub period among first and second sub periods constituting the second period; and
transmitting information about the at least one used CID in the second sub period on a resource unit of a fourth resource index having a transpose relationship with the third resource index,
wherein, in each of the sub periods, information about the at least one used CID is detected from the at least one surrounding device during remaining symbol periods, except for symbol periods in which the information about the at least one used CID is transmitted.

13. The method of claim 9, further comprising:
transmitting information about the at least one used CID being used by the transmitting device on a resource unit of a third resource index in a first sub period among first to fourth sub periods constituting the second period; and
transmitting information about the CID being used by the transmitting device in the second sub period on a resource unit of a fourth resource index having a transpose relationship with the third resource index,
wherein:
the first and second sub periods are determined as being the first two sub periods or the last two sub periods of the second period, and
in each of the sub periods, information about the at least one used CID is detected from the at least one surrounding device during remaining symbol periods, except for symbol periods in which the information about the at least one used CID is transmitted.

14. The method of claim 9, wherein the generation information further includes at least one of the device ID of the transmitting device, the device ID of the receiving device, and information about the type and Quality of Service (QoS) of a service to be performed through a connection.

15. The method of claim 9, further comprising:
after receiving the generation information, transmitting information about the selected at least one CID in the third period on a resource unit corresponding to the resource unit of the second resource index.

16. The method of claim 9, wherein the generation information is scrambled with at least one of the device ID of the transmitting device and the device ID of the receiving device before being received.

17. A transmitting device for generating a Connection Identifier (CID) for Device-to-Device (D2D) communication, the transmitting device comprising:
a controller configured to determine a first resource index for transmitting a request signal for requesting direct communication between a transmitting device and a receiving device, and a second resource index being identical to the first resource index, based on a device ID of the transmitting device and a device ID of the receiving device;
a transmitter configured to transmit the request signal on a resource unit of the first resource index during a predetermined first period; and
a receiver configure to receive information about at least one used CID being used by at least one surrounding device from the surrounding device during a second period following the first period, wherein the controller is configured to control the transmitter to transmit generation information including at least one available CID acquired during the second period, to the receiving device, on a resource unit of the second resource index during a third period following the second period, and determines at least one CID to be used for D2D communication between the transmitting device and the receiving device from the at least one available CID included in the transmitted generation information, wherein the first resource index is calculated by performing a predetermined operation on the device ID of the transmitting device and the device ID of the receiving device and performing a modulo operation on a result value of the predetermined operation.

18. The transmitting device of claim 17, wherein the first resource index is determined based on the device ID of the receiving device.

19. The transmitting device of claim 17, wherein the first resource index is calculated by performing the predetermined operation on the device ID of the transmitting device and the device ID of the receiving device, and performing the modulo operation on the result value of the predetermined operation with an amount of resources constituting the first period.

20. The transmitting device of claim 17,
wherein the transmitter is configured to:
transmit information about the at least one used CID on a resource unit of a third resource index in a first sub period among first and second sub periods constituting the second period, and
transmit information about the at least one used CID in the second sub period on a resource unit of a fourth resource index having a transpose relationship with the third resource index, and
wherein in each of the sub periods, the receiver is configured to detect information about used CID from the at least one surrounding device during remaining symbol periods except for symbol periods in which the information about the used CID is transmitted.

21. The transmitting device of claim 17,
wherein the transmitter is configured to:
transmit information about the at least one used CID being used by the transmitting device on a resource unit of a third resource index in a first sub period among first to fourth sub periods constituting the second period, and
transmit information about the CID being used by the transmitting device in the second sub period on a resource unit of a fourth resource index having a transpose relationship with the third resource index, and
wherein:
the first and second sub periods are determined as first two sub periods or last two sub periods of the second period, and
in each of the sub periods, the receiver is configured to detect information about the at least one used CID from the at least one surrounding device during remaining symbol periods except for symbol periods in which the information about the at least one used CID is transmitted.

22. The transmitting device of claim 17, wherein the generation information further includes at least one of the device ID of the transmitting device, the device ID of the receiving device, and information about the type and Quality of Service (QoS) of a service to be performed through a connection.

23. The transmitting device of claim 17, wherein after the generation information is transmitted, the receiver is configured to receive information about at least one available CID selected by the receiving device from the receiving device in the third period on a resource unit corresponding to the resource unit of the second resource index.

24. The transmitting device of claim 17, wherein the generation information is scrambled with at least one of the device ID of the transmitting device and the device ID of the receiving device before being transmitted.

25. A receiving device for generating a Connection Identifier (CID) for Device-to-Device (D2D) communication, the receiving device comprising:
a controller configured to determine a first resource index for receiving a request signal for requesting direct communication between a transmitting device and a receiving device and a second resource index being identical to the first resource index, based on a device ID of the transmitting device and a device ID of the receiving device;
a receiver configured to:
receive the request signal from the transmitting device on a resource unit of the first resource index during a predetermined first period,
receive information about at least one used CID being used by at least one surrounding device from the surrounding device during a second period following the first period, and
receive generation information including at least one available CID from the transmitting device on a resource unit of the second resource index during a third period following the second period; and
a transmitter,
wherein the controller is configured to select at least one CID to be used for D2D communication between the transmitting device and the receiving device from the at least one available CID included in the received generation information,
wherein the first resource index is calculated by performing a predetermined operation on the device ID of the transmitting device and the device ID of the receiving device and performing a modulo operation on a result value of the predetermined operation.

26. The receiving device of claim 25, wherein the first resource index is determined based on the device ID of the receiving device.

27. The receiving device of claim 25, wherein the first resource index is calculated by performing the predetermined operation on the device ID of the transmitting device and the device ID of the receiving device, and performing the modulo operation on the result value of the predetermined operation with an amount of resources constituting the first period.

28. The receiving device of claim 25,
wherein the transmitter is configured to:
transmit information about the at least one used CID on a resource unit of a third resource index in a first sub period among first and second sub periods constituting the second period, and
transmit information about the at least one used CID in the second sub period on a resource unit of a fourth resource index having a transpose relationship with the third resource index, and
wherein, in each of the sub periods, the receiver is configured to detect information about used CID from the at least one surrounding device during remaining symbol periods except for symbol periods in which the information about the at least one used CID is transmitted.

29. The receiving device of claim 25,
wherein the transmitter is configured to:
   transmit information about the at least one used CID being used by the transmitting device on a resource unit of a third resource index in a first sub period among first to fourth sub periods constituting the second period, and
   transmit information about the CID being used by the transmitting device in the second sub period on a resource unit of a fourth resource index having a transpose relationship with the third resource index, and
wherein:
   the first and second sub periods are determined as first two sub periods or last two sub periods of the second period, and
   in each of the sub periods, the receiver is configured to detect information about the at least one used CID from the at least one surrounding device during remaining symbol periods except for symbol periods in which the information about the at least one used CID is transmitted.

30. The receiving device of claim 25, wherein the generation information further includes at least one of the device ID of the transmitting device, the device ID of the receiving device, and information about the type and Quality of Service (QoS) of a service to be performed through a connection.

31. The receiving device of claim 25, wherein after receiving the generation information, the transmitter is configured to transmit information about the selected at least one CID in the third period on a resource unit corresponding to the resource unit of the second resource index.

32. The receiving device of claim 25, wherein the generation information is scrambled with at least one of the device ID of the transmitting device and the device ID of the receiving device before being received.

* * * * *